United States Patent
Grimm et al.

(10) Patent No.: US 11,733,791 B2
(45) Date of Patent: Aug. 22, 2023

(54) OPERATING ARRANGEMENT FOR A CONSTRUCTION MACHINE

(71) Applicant: JOSEPH VOEGELE AG, Ludwigshafen/Rhein (DE)

(72) Inventors: Frank Grimm, Edingen-Neckarhausen (DE); Dennis Hanfland, Speyer (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 419 days.

(21) Appl. No.: 16/286,746

(22) Filed: Feb. 27, 2019

(65) Prior Publication Data

US 2019/0264400 A1  Aug. 29, 2019

(30) Foreign Application Priority Data

Feb. 27, 2018 (EP) ................................... 18158753

(51) Int. Cl.
  *G06F 3/039* (2013.01)
  *G06F 3/04886* (2022.01)
  (Continued)

(52) U.S. Cl.
  CPC ............ *G06F 3/0393* (2019.05); *B60K 35/00* (2013.01); *G06F 3/04886* (2013.01);
  (Continued)

(58) Field of Classification Search
  CPC ...... E01C 23/00; E01C 19/48; E01C 19/4826; E01C 2301/30; E02F 9/2004;
  (Continued)

(56) References Cited

U.S. PATENT DOCUMENTS 5,867,106 A * 2/1999 Bi .......................... G06F 1/3262
                                                    340/5.54
6,640,434 B1   11/2003 Wojewnik et al.
(Continued)

FOREIGN PATENT DOCUMENTS

CN  105970778 A  9/2016
CN  107172884 A  9/2017
(Continued)

OTHER PUBLICATIONS

Kane et al. "Touchplates: Low-Cost Tactile Overlays for Visually Impaired Touch Screen Users". ASSETS '13, Oct. 21-23, 2013, Bellevue, WA, USA, ACM 978-1-4503-2405-2/13/10...$15.00. (Year: 2013).*

(Continued)

*Primary Examiner* — Julie Anne Watko
(74) *Attorney, Agent, or Firm* — Brooks Kushman P.C.

(57) ABSTRACT

An operating arrangement for a construction machine comprises an operating device which comprises a touch-sensitive display for inputting operating instructions by an operator, and an operating mask with localization markers. The operating device comprises at least a first alignment feature for aligning the operating mask on the operating device in a pre-defined operating position relative to the operating device. The operating mask is detachably attached to the operating device in the operating position, wherein the operating mask at least partially covers the touch-sensitive display, and wherein the location markers of the operating mask lie over specified areas of the display and facilitate locating the specified areas of the display for inputting instructions.

21 Claims, 3 Drawing Sheets

(51) Int. Cl.
*B60K 35/00* (2006.01)
*G06F 3/04847* (2022.01)
*E01C 19/48* (2006.01)

(52) U.S. Cl.
CPC ............... *B60K 2370/1438* (2019.05); *B60K 2370/1446* (2019.05); *B60K 2370/1468* (2019.05); *B60K 2370/175* (2019.05); *B60K 2370/197* (2019.05); *B60K 2370/573* (2019.05); *B60K 2370/693* (2019.05); *E01C 19/48* (2013.01); *G06F 3/04847* (2013.01); *G06F 2203/04809* (2013.01)

(58) Field of Classification Search
CPC ............... G06F 3/0393; G06F 3/04886; G06F 3/04847; G06F 2203/04807; G06F 2203/04809; B60K 35/00; B60K 37/06; B60K 2370/161; B60K 2370/1876; B60K 2370/195; B60K 2370/682; B60K 2370/1446; B60K 2370/339; B60K 2370/693; B60K 2370/81; B60K 2370/158; B60K 2370/175; B60K 2370/816; B60K 2370/10; B60K 2370/152; B60K 2370/16; B60K 2370/197; B60K 2370/199; B60K 2370/186; B60K 2370/80; B60K 2370/28; B60K 2370/828; B60K 2370/1468; B60K 2370/191; B60K 2370/1438; B60K 2370/1442; B60K 2370/573; B60K 2370/61

See application file for complete search history.

(56) References Cited

U.S. PATENT DOCUMENTS

| | | | |
|---|---|---|---|
| 7,102,623 | B2 | 9/2006 | Morath |
| 9,108,689 | B1 | 8/2015 | Shelby et al. |
| 10,209,739 | B2 | 2/2019 | Nessel |
| 10,496,132 | B2 | 12/2019 | Nessel |
| 10,539,886 | B2 | 1/2020 | Van der Meulen et al. |
| 2005/0276448 | A1* | 12/2005 | Pryor ..................... B60K 37/06 382/103 |
| 2011/0108625 | A1* | 5/2011 | Lee ..................... A63F 13/2145 235/448 |
| 2014/0002417 | A1* | 1/2014 | Yoshida ................ A63F 13/213 345/174 |
| 2014/0108936 | A1* | 4/2014 | Khosropour ............ G06F 9/451 715/735 |
| 2015/0263309 | A1* | 9/2015 | Hong .................. H01L 51/5246 257/40 |
| 2016/0062482 | A1* | 3/2016 | Nietvelt ............. G06F 3/04883 345/173 |
| 2016/0266610 | A1* | 9/2016 | Nessel .................. B60K 35/00 |
| 2018/0052963 | A1* | 2/2018 | Eguchi ............... G06F 3/04886 |

FOREIGN PATENT DOCUMENTS

| | | |
|---|---|---|
| DE | 102005022476 A1 | 11/2006 |
| DE | 10 2009 018 955 A1 | 10/2010 |
| EP | 3 067 774 A1 | 9/2016 |
| JP | S58-50431 Y2 | 11/1983 |
| JP | S60244650 A | 12/1985 |
| JP | 2014-149675 A | 8/2014 |
| JP | 2016-180300 A | 10/2016 |

OTHER PUBLICATIONS

Landau et al. "Development of a Talking Tactile Tablet". Information Technology and Disabilities E-Journal, 7(2), Apr. 2001. (Year: 2001).*
Alphie: The Electronic Robot. Playskool, Inc. (Year: 1978).*
Leap Start Parent User Guide. Leap Frog. (Year: 2017).*
Playskool, "ALPHIE TM", 33216, Hasbro, 2010. (Year: 2010).*
Japanese Office Action dated Jan. 29, 2020, Application No. 2019-018672—English Machine Translation (Notice of Reasons for Refusal) Included, total 6 Pages.
Extended European Search Report dated Apr. 23, 2018, (with English Machine Translation), Application No. 18158753.6-1012, Applicant Joseph Voegele AG, 16 Pages.
Chinese Office Action dated Oct. 12, 2020 (with English Machine Translation), Application No. 201910126108.8, 24 Pages.
Chinese Office Action dated Nov. 19, 2021 (with English Machine Translation), Application No. 201910126108.8, 11 Pages.

* cited by examiner

OPERATING ARRANGEMENT FOR A CONSTRUCTION MACHINE

CROSS-REFERENCE TO RELATED APPLICATIONS

This application claims foreign priority benefits under 35 U.S.C. § 119(a)-(d) to European patent application number EP 18158753.6, filed Feb. 27, 2018, which is incorporated by reference in its entirety.

TECHNICAL FIELD

The present disclosure related to operating arrangements for construction machines, in particular for road finishers or feeders.

BACKGROUND

From EP 3 067 774 A1 an operating arrangement for a construction machine according to the preamble of claim 1 is known. This operating arrangement comprises an operating device with a plurality of operating elements for setting operating parameters of the construction machine. In addition, the operating device comprises a display unit which is configured to display technical data such as set operating parameters, operating instructions, service instructions or instantaneous operating states of individual functional units of the construction machine. The display unit can include a touch-sensitive display, which provides a virtual keyboard for setting a variety of operating parameters of the construction machine.

In contrast to pure operability by means of physical operating switches, the provision of a virtual keyboard for setting operating parameters of the construction machine by means of a touch-sensitive display has the advantage that the operating arrangement can be adapted by means of a software update when the machine configuration of the construction machine or the like is changed and no physical exchange of operating elements is required. In addition, it will be possible to produce only one universal operating arrangement for construction machines of different types, which will then be adapted to the requirements for the operability of a construction machine of the desired type by installing suitable software.

However, it has been shown that known touch-sensitive displays for setting operating parameters of a construction machine also have disadvantages during operation. For example, it can be problematic if the operator does not receive any feedback about the successful operation after actuating a certain input area of the touch-sensitive display, as he would have received if he had pressed a physical key. In addition, the operator cannot rely on his sense of touch to find an input area of the touch-sensitive display, but must look at the display during operation of the construction machine to ensure that he finds and actuates the desired input area. This makes it difficult for the operator to monitor the operation and environment of his machine in addition to inputting data.

SUMMARY

It is an object of the present disclosure to provide an operating arrangement for a construction machine whose operating configuration is to be adaptable without major conversion work and which is to be improved with regard to its operability in operation. In addition, a corresponding procedure for re-configuring an operating arrangement for a construction machine is to be provided.

An operating arrangement according to the disclosure for a construction machine comprises a control device with a touch-sensitive display for inputting operating instructions by an operator. By means of the touch-sensitive display, in particular operating instructions for setting operating parameters of the construction machine and/or display instructions can be entered. On the touch-sensitive display, different areas can be assigned to different operating functions by software.

The operating arrangement may also include an operating mask with localization markers. The operating device comprises at least one first alignment feature by means of which the operating mask can be aligned on the operating device in a predefined operating position relative to the operating device. The operating mask is detachably attached to the operating device in the pre-defined operating position and covers at least some areas of the touch-sensitive display. The localization markers are located above specified areas of the display and facilitate finding the specified areas of the display for entering instructions.

The operating mask makes it easier for the operator to enter operating instructions using the touch-sensitive display. The operator can more easily locate the specified areas of the display by using the localization markers. This allows the operator to pay more attention to other parallel activities such as site monitoring.

The operating mask can include a transparent material so that the display can be viewed through the operating mask. This makes it easy to use covered areas of the display to display information. It is also conceivable that the operating mask is completely or partially opaque.

The operating mask can be designed in such a way that it is not possible to operate the touch-sensitive display through the material of the operating mask. However, depending on the application and design of the localization markers, it is also conceivable to design the operating mask in such a way that it is possible to actuate the underlying areas of the display by pressing the operating mask.

The first alignment feature of the operating device ensures that the operating mask is attached to the operating device in the correct operating position and that the localization markers are actually positioned above the desired areas of the display.

Since attachment of the operating mask at the operating device is detachable, the operating mask can be replaced relatively easily with another operating mask. This can be useful, for example, if the shape, number and/or arrangement of the active areas of the touch-sensitive display is changed due to a software update or a change in the machine configuration of the construction machine. The operating mask can then be replaced by another operating mask with differently arranged and/or shaped localization markers. The new operating mask can also be aligned relative to the operating device using the first alignment feature of the operating device in a pre-defined operating position.

Preferably, the pre-defined operating position is unambiguously defined by the at least one alignment feature. This prevents misalignment of the operating mask.

The operating mask can include at least one second alignment feature which interacts with the at least one first alignment feature to align the operating mask at the operating device in the pre-defined operating position. The first alignment feature and the second alignment feature can interact, for example, by physical engagement. Alternatively or additionally, it would also be conceivable that the first alignment feature and the second alignment feature interact in such a way that they allow optical alignment of the operating mask. It is also conceivable that the first and second alignment features could interact by means of an additional element.

In principle, it is sufficient if the first alignment feature is designed to align the operating mask on the operating device. In accordance with an advantageous embodiment, the at least one first alignment feature, however, also contributes to the detachable holding of the operating mask on the operating device. For this purpose, the first alignment feature can interact with an element of the operating mask, in particular with the second alignment feature.

The at least one first alignment feature may include an elevation of the operating device and the operating mask may have a corresponding recess so that the pre-defined operating position of the operating mask relative to the operating device is defined by an engagement of the elevation of the operating device with the recess of the operating mask. In addition, or alternatively, the first alignment feature may include a recess in the operating device and the operating mask may have a corresponding projection. The pre-defined operating position of the operating mask can be defined by an engagement of the operating mask projection into the recess of the operating device. Alignment of the operating mask on the operating device by engaging an elevation or a projection in a recess can be achieved particularly reliably and intuitively during installation. In addition, this prevents the operating mask from being moved in relation to the operating device.

According to an embodiment, the at least one first alignment feature includes one or a plurality of threaded holes, and the operating mask includes one or more corresponding through holes for screws that can be screwed into the threaded holes. The pre-defined operating position of the mask may be partially or fully defined by the positioning of the threaded holes and through holes. In addition to their function for aligning the operating mask, the threaded holes and through holes also contribute to the detachable attachment of the operating mask to the operating device.

The at least one first alignment feature may include a boundary whose shape corresponds at least sectionally to an outline of the operating mask. The operating mask can be easily aligned by inserting it into the area defined by the boundary. Preferably, the operating mask can only be inserted into the area surrounded by the boundary in the predefined operating position.

There could also be a detachable connection between the operating mask and the operating device that can be established by sliding it on. Such a sliding connection allows a particularly defined alignment of the operating mask with respect to the operating device. The at least one first alignment feature may include an abutment of such a slide-on connection. It is also possible to clip the operating mask onto the operating device and/or the display.

Preferably the at least one first alignment feature is formed on the operating device outside the touch-sensitive display. Production can thus be simplified considerably, since a standard available touch-sensitive display can be used.

Preferably, the localization markers include tactile structures that can be touched by the operator. Such tactile structures can make it easier for the operator to orient himself on the operating mask. By using the tactile structures, at least as soon as he is sufficiently familiar with the display configuration, the operator no longer has to look at the display every time he wants to enter operating instructions, and can better concentrate on other activities and monitoring the job site situation. In addition, the tactile structures give the operator feedback that he has hit one of the specified areas of the display. It also reduces the risk of inadvertent simultaneous actuation of several of the specified areas of the display.

The tactile structures can in particular be raised or lowered structures or surface modifications such as roughened areas.

It is particularly preferred if the localization markers include operating openings through which the respective specified areas of the touch-sensitive display can be reached by touch for inputting operating instructions. The operating openings allow "blind" operation of the touch-sensitive display by touching the operating openings and provide the user with tactile feedback. In particular, the risk of inadvertent simultaneous operation of several of the specified areas of the display is reduced. Operating openings can be provided alone or in conjunction with other tactile structures.

It would also be conceivable to form the localization markers in other ways, for example non-tactile, in particular as color markings.

The disclosure also refers to a construction machine with the described operating arrangement. The construction machine can be in particular a road finisher with a hopper and a paving screed or a feeder for a road finisher. However, embodiments according to the disclosure can also be applied to other construction machines, such as excavators, loaders, mining vehicles or various transport vehicles. Preferably, the specified areas of the touch-sensitive display are assigned to a specific function of the construction machine.

The disclosure also refers to a method for re-configuring an operating arrangement of the type described. The method involves changing the programming of the touch-sensitive display. This can be done in particular by software adaptations, in particular in the form of a software update or a new installation of other software or another software version. When changing the programming of the touch-sensitive display, the shape, arrangement, position and/or number of areas of the touch-sensitive display configured for entering certain operating instructions can be changed. The method also includes removing the first operating mask detachably attached to the operating device from the operating device. A second operating mask is aligned in a predefined operating position on the operating device by means of the at least one first alignment feature of the operating device. In the predefined operating position, the second operating mask is detachably attached to the operating device. The second operating mask also includes localization markers. After attaching the second operating mask, it covers at least some areas of the touch-sensitive display, whereby the localization markers of the second operating mask lie above specified areas of the display. The localization markers of the second operating mask are arranged in such a way that they are at least partially above other areas of the display than the areas above which the localization markers of the first operating mask were located. This may already be fulfilled if a localization marker of the second operating mask is located above an area over which no localization marker of the first operating mask was located, or if no localization marker of the second operating mask is located above an area over which a localization marker of the first operating mask was located.

The programming of the touch-sensitive display may be changed before, after or simultaneously with the removal of the first operating mask and/or the alignment or attachment of the second operating mask.

By exchanging the operating masks, the operating arrangement can be re-configured at a later date without major conversion work.

The detachable attachment of the second operating mask can include screwing to the operating device, clipping to the operating device and/or sliding onto the operating device.

In the following, embodiments according to the disclosure will be further explained with reference to the attached drawings.

DETAILED DESCRIPTION

Figure 1A:
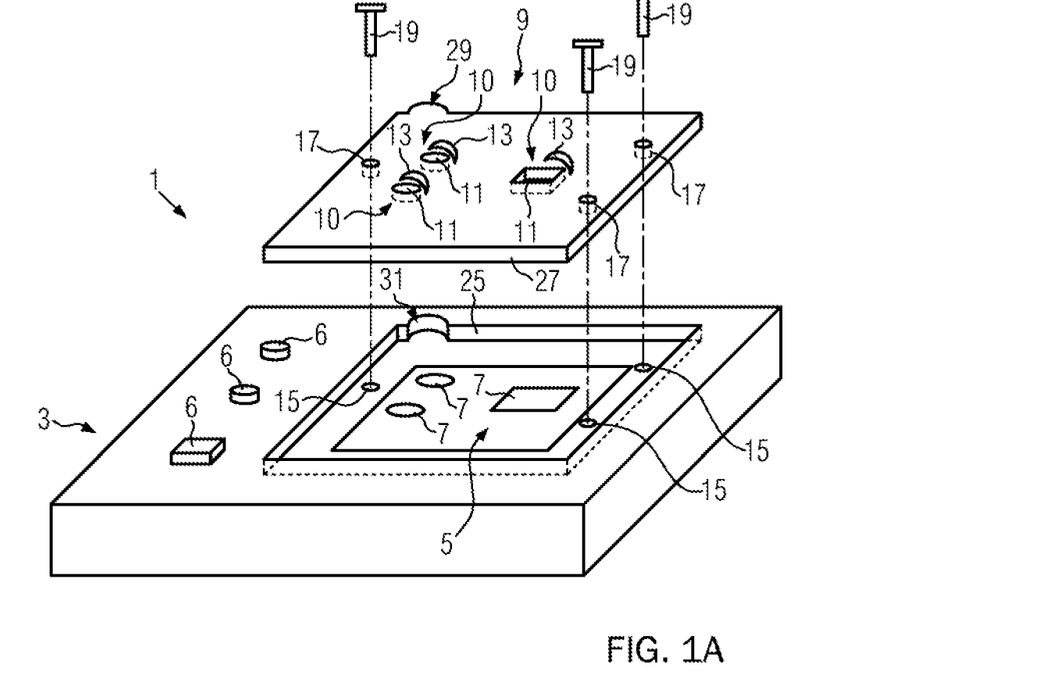
FIG. 1A shows a schematic representation of an operating arrangement for a construction machine according to an embodiment in a disassembled state of the operating mask.
Figure 1B:
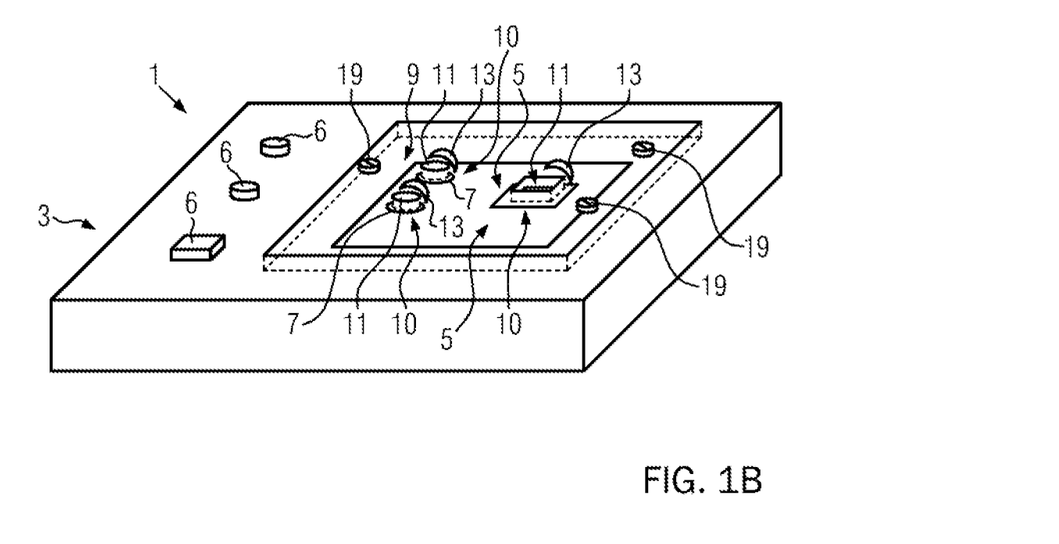
FIG. 1B shows a schematic representation of the operating arrangement from FIG. 1A in the fixed state of the operating mask.

FIGS. 1A and 1B show an embodiment of an operating arrangement 1 for a construction machine. The operating arrangement 1 comprises an operating device 3 with a touch-sensitive display 5. In addition to the touch-sensitive display 5, further input elements 6, shown here in the form of push buttons, are provided on the operating device 3 to control the construction machine. However, this is not necessary.

The touch-sensitive display 5 allows an operator to enter operating instructions. These can be, for example, inputs for controlling the construction machine or display commands. A suitable user interface can also be shown on the display 5 to facilitate operation. A plurality of input areas 7 are defined on the touch-sensitive display 5 by means of suitable programming, each of which is assigned to a specific operating instruction. To enter an operating instruction, an operator can touch the assigned input area 7 with his finger and/or an object such as a pen. The touch-sensitive display 5 can be a commercially available touch-sensitive display that can be connected to a control device of the construction machine. It is also conceivable that the touch-sensitive display 5 already has a control device itself, which in turn can be connected to a control device of the construction machine. Preferably the touch-sensitive display 5, in particular the distribution and function binding of the input areas 7, can be freely programmed by means of software. It would also be conceivable to use a tablet or mobile phone with a touch-sensitive display in the operating device 3, fixed or detachable.

The operating arrangement 1 further comprises an operating mask 9 with a plurality of localization markers 10. FIG. 1A shows the operating arrangement 1 in a disassembled state in which the operating mask 9 was removed from the operating device 3. FIG. 1B shows an assembled condition in which the operating mask 9 is detachably attached to the operating device 3 in a pre-defined operating position relative to the operating device 3. As shown in the Figures, the operating mask 9 can be in the form of a plate. It would also be conceivable, for example, to provide the operating mask 9 as a foil or as a laminate of a plurality of foils.

In the pre-defined operating position, the operating mask 9 partly covers the touch-sensitive display 5. When the operating mask 9 is attached, the localization markers 10 of the operating mask 9 lie above specified areas of the touch-sensitive display 5. The programming of the touch-sensitive display 5 and the configuration of the operating mask 9 can be coordinated in such a way that the localization markers 10 lie above relevant input areas 7 of the display 5.

In the embodiment shown, the localization markers 10 comprise operating openings 11. The operating mask 9 can optionally be designed in such a way that it is not possible to operate the display 5 in covered areas. With the operating mask 9 attached, the touch-sensitive display 5 can only be reached through the operating openings 11 of the operating mask 9. Thus, when the operating mask 9 is attached, only the areas of the touch-sensitive display 5 defined by the positioning of the operating openings 11 can be reached for inputting instructions by touch. During operation, the operator can feel the operating openings 11 formed in the operating mask 9 and thus operate the touch-sensitive display 5 without having to constantly look at it. The operating mask 9 with the localization markers 10 thus facilitates orientation on the touch-sensitive display 5. If only input areas 7 are accessible through the operating openings 11, the operator can also be sure that an input was actually made when touching the touch-sensitive display 5 and that he did not just miss the respective input area 7.

In the embodiment shown, the localization markers 10 include tactile structures 13 in addition to the operating openings 11, which further facilitate orientation for the operator. In the version shown, the tactile structures 13 are in the form of raised structures that make the positions of the operating openings 11 easier to find. The tactile structures 13 shown partially surround the operating openings 11. However, it would also be conceivable, for example, that the tactile structures 13 completely surround the operating openings 11. It would also be conceivable, however, that tactile structures 13 would exist in the form of raised structures without the simultaneous provision of operating openings 11. In this case it makes sense to make the display 5 operable through the operating mask 9. The provision of tactile structures of another type is also conceivable in addition or alternatively, for example in the form of lowered structures or surface modifications, such as roughened areas.

The detachable connection between the operating device 3 and the operating mask 9 is realized in the embodiment shown by screw connections. The operating device 3 comprises a plurality of threaded holes 15 and the operating mask 9 comprises a plurality of corresponding through holes 17 for screws 19 which can be screwed into the threaded holes 15. The threaded holes 15 are provided at positions outside the touch-sensitive display 5 in the operating device 3. In the embodiment shown, the threaded holes 15 are distributed asymmetrically around the display 5 in such a way that the operating mask 9 can only be attached to the operating device 3 in the correct orientation, the pre-defined operating position. The threaded holes 15 together thus form a first alignment feature for aligning the operating mask 9 on the operating device 3 in the pre-defined operating position relative to the operating device 3. The through holes 17 formed by the operating mask 9 for the screws 19 together form a second alignment feature which interacts with the first alignment feature to align the operating mask 9 on the operating device 3 in the pre-defined operating position. The threaded holes 15 and the through holes 17 allow both an alignment of the operating mask 9 and an attachment of the operating mask 9 to the operating device 3.

In order to further facilitate correct installation of the operating mask 9, the operating device 3 has an additional first alignment feature according to the embodiment of FIGS. 1A and 1B. This is given by a boundary 25, the shape of which corresponds to the outline 27 of operating mask 9. In the version shown, the boundary 25 is given by the fact that an area of the operating device 3 corresponding to the outline 27 of the operating mask 9, in which also the display 5 is arranged, is lowered. However, it would also be conceivable that the boundary 25 is designed differently, for example by a circumferential elevation. The outline 27 of the operating mask 9 and the course of the boundary 25 can be designed in such a way that the operating mask 9 can only be inserted into the area surrounded by the boundary 25 in the pre-defined operating position. In the embodiment shown, this is realized by an alignment nose 29 of the operating mask 9 and a corresponding receiving area 31 of the boundary 25.

In the embodiment shown in FIGS. 1A and 1B, two first alignment features are provided, namely the asymmetrical arrangement of the threaded holes 15 and the boundary 25. However, it would also be sufficient to provide only one first alignment feature which allows alignment of the operating mask 9 at the operating device 3 in the pre-defined operating position.

Figure 2:
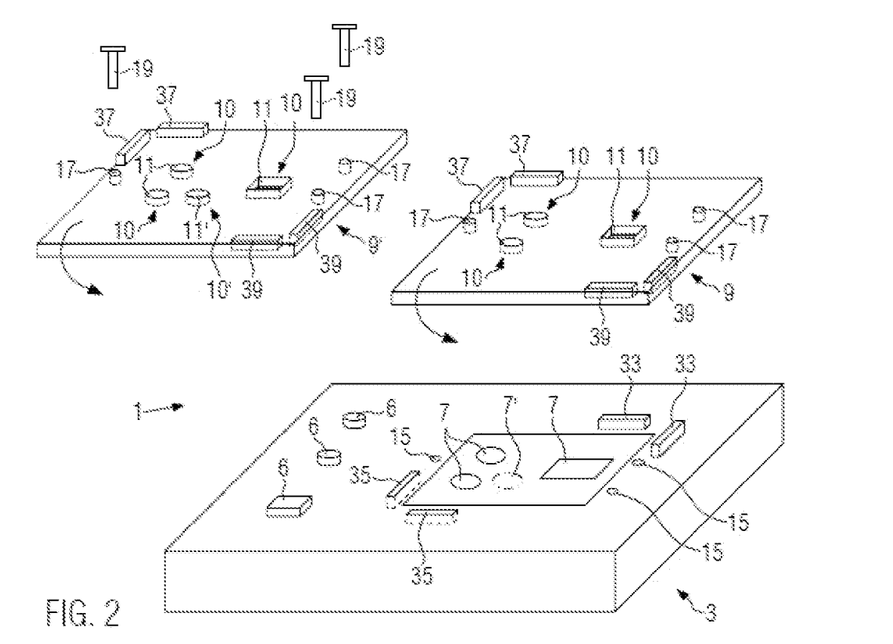
FIG. 2 shows a schematic representation of an operating arrangement according to a further embodiment, wherein two operating masks interchangeable with each other are shown.

FIG. 2 shows an operating arrangement 1 according to another embodiment. FIG. 2 shows two operating masks 9, 9', which differ in the configuration of the localization markers 10, 10', which are designed here as operating openings 11, 11', and which can alternatively be attached on the operating device 3.

The embodiment shown in FIG. 2 differs from the embodiment of FIGS. 1A and 1B, among other things, in that the operating device 3 does not comprise a boundary 25, the shape of which at least partly corresponds to the outline 27 of the operating mask 9. Instead, the operating device 3 of the embodiment as shown in FIG. 2 has, in addition to the special arrangement of the threaded holes 15 (identical to FIGS. 1A and 1B), another first alignment feature for aligning the operating mask 9 on the operating device 3 in the pre-defined operating position. Outside the touch-sensitive display 5, elevations 33 and recesses 35 are provided on the operating device 3. Corresponding recesses 39 and projections 37 are provided on the side of the operating mask 9 facing the display 5 when mounted (facing upwards in FIG. 2). The elevations 33 of the operating device 3 are designed to engage in the recesses 39 of the operating mask 9 when the operating mask 9 is in the pre-defined operating position relative to the operating device 3. The projections 37 of the operating mask 9 are designed to engage in the recesses 35 of the operating device 3 when the operating mask 9 is relative to the operating device 3 in the pre-defined operating position. In the embodiment shown, the elevations 33 and the recesses 35 of the operating device 3 form a first alignment feature for aligning the operating mask 9 with the operating device 3 in the pre-defined operating position. The projections 37 and recesses 39 of the operating mask 9 form a second alignment feature which interacts with the first alignment feature to align the operating mask 9 on the operating device 3 in the pre-defined operating position.

It would also be conceivable to omit the projections 37 of the operating mask 9 and the recesses 35 of the operating device 3, so that only the elevations 33 of the operating device 3 and the recesses 39 of the operating mask 9 are provided. Alternatively, it would also be possible to omit the elevations 33 of the operating device 3 and the recesses 39 of the operating mask 9, so that only the projections 37 of the operating mask 9 and the recesses 35 of the operating device 3 are provided. The elevations 33 and the projections 37 as well as the corresponding recesses 35, 39 could also be provided in a different number or form. Preferably, they allow a unambigous alignment of the operating mask 9 with the operating device 3.

The operating mask 9 shown in FIG. 2 directly above the operating device 3 has the same configuration as the operating mask 9 shown in FIGS. 1A and 1B with regard to the arrangement of the operating openings 11. To re-configure the operating arrangement 1, the operating mask 9 can be exchanged for another operating mask 9'. FIG. 2 shows an example of a situation in which the programming of the touch-sensitive display 5 is changed by adding a further input area 7' (shown in FIG. 2 in dotted lines). For example, the operating arrangement 1 can be upgraded by adding new functions. In order to adapt the operating arrangement 1 to the new display configuration with the additional input area 7', the first operating mask 9 shown in FIG. 2 directly above the operating device 3 is removed and replaced by the second operating mask 9' shown next to it, which has an additional operating opening 11'. Otherwise, the operating masks 9, 9' do not differ from each other. In particular, the devices for fixing and aligning the operating mask 9, 9' are identical for both operating masks 9, 9'.

Figure 3:
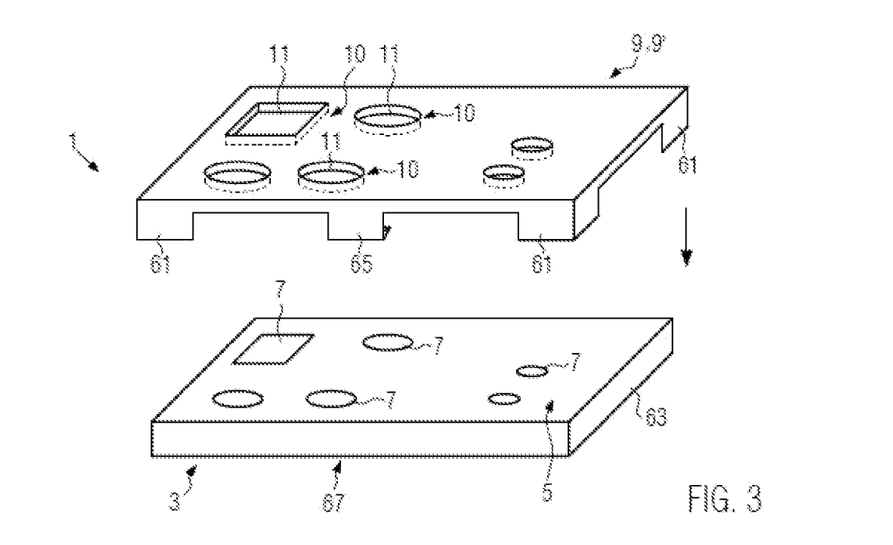
FIG. 3 shows a schematic representation of an operating arrangement according to a further embodiment.

FIG. 3 shows an operating arrangement 1 according to another embodiment. The localization markers 10 of the operating mask 9, 9' are also designed as operating openings 11 in this embodiment, which enable the assigned input areas 7 of the touch-sensitive display 5 to be reached. Alignment and fastening of the operating mask 9, 9' in relation to the display 5 is, however, carried out differently from the embodiments described with reference to FIGS. 1A, 1B and 2.

In accordance with the embodiment shown in FIG. 3, the operating mask 9, 9' comprises abutment elements 61 protruding in the direction towards the operating device 3, said abutment elements being adapted to be placed against a side surface 63 of an area of the operating device 3 receiving the display 5 or against a side surface 63 of the display 5 itself. In the variant shown, the display 5 is essentially free-standing or protrudes from a base part of the operating device 3 that is not shown, so that the side surface 63 is formed by the display 5 itself. However, it would also be conceivable that the display 5 is embedded in an elevation of the operating device 3 and this elevation defines the side surface 63. Preferably, the abutment elements 61 are designed to lie against corner areas of the side surface 63 and in particular to enclose these. The interaction between the abutment elements 61 and the side surface 63 allows the operating mask 9, 9' to be aligned in the pre-defined operating position relative to the operating device 3.

The operating mask 9, 9' is attached as shown in FIG. 3 using a hook element 65 which protrudes from the operating mask 9, 9' in the direction of the operating device 3. The hook element 65 is designed to fasten the operating mask 9, 9' to the operating device 3 by means of a clip-on engagement with a corresponding holding structure 67 of the operating device 3. In the variant shown, the hook element 65 clip-like engages in an area of the side surface 63.

However, it would also be conceivable that the holding structure 67 is designed as a separate feature of the operating device 3. The provision of further hook elements 65 would also be conceivable.

Of course, the various embodiments can be combined with each other. For example, the hook element 65 could be omitted from the operating mask 9, 9' shown in FIG. 3 and instead a fastening to the operating device 3 by means of screws could be used, as shown in FIGS. 1A, 1B and 2.

In principle, the operating arrangement 1 according to the disclosure can be used in any construction machine. Particularly preferred is the use in self-driven construction machines, such as a road finisher 41 or a feeder 47 for road construction.

Figure 4:
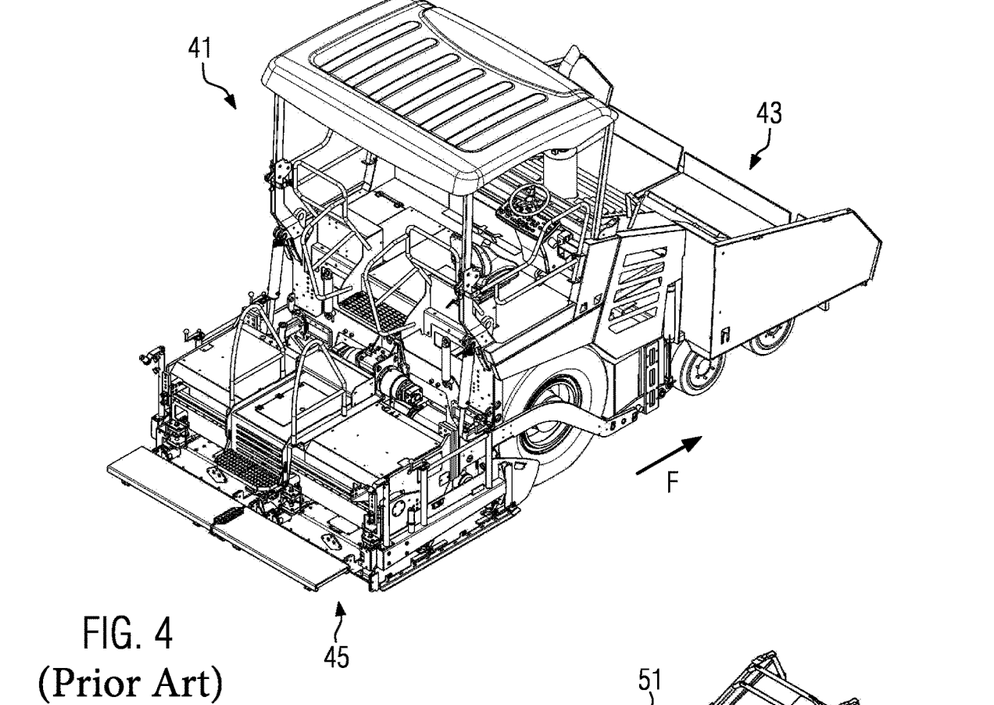
FIG. 4 shows a schematic representation of a road finisher with an operating arrangement in accordance with an embodiment.

FIG. 4 shows a schematic view of a road finisher 41 with a material hopper 43 at the front in paving direction F and a paving screed 45 at the rear in paving direction F, which can be equipped with the operating arrangement 1 according to the disclosure.

Figure 5:
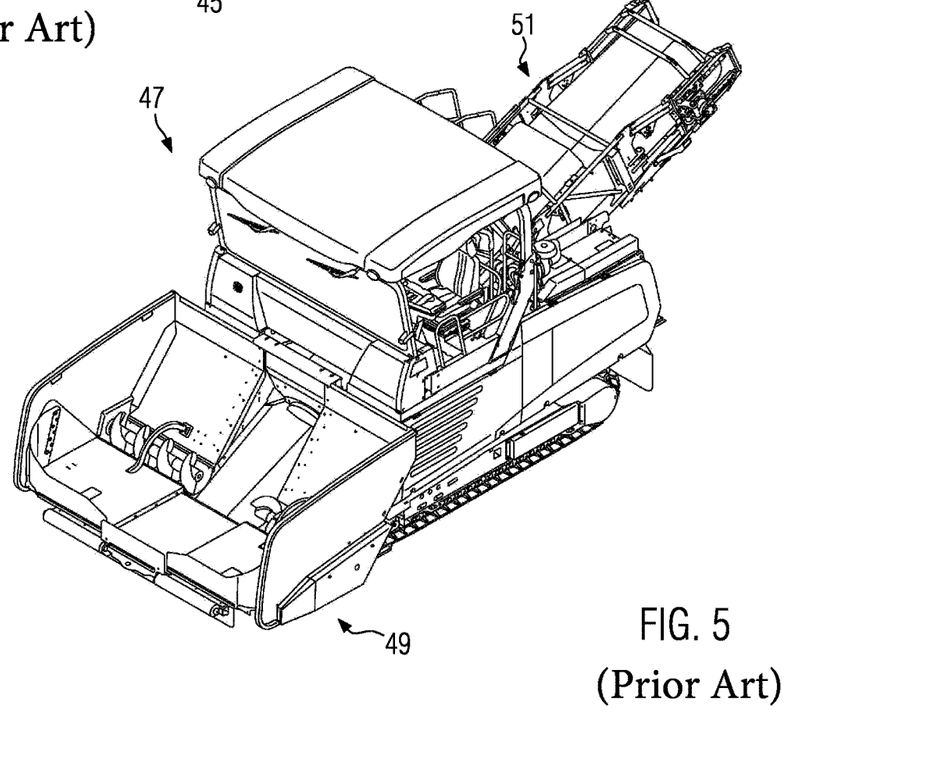
FIG. 5 shows a schematic representation of a feeder with an operating arrangement according to an embodiment.

FIG. 5 shows a schematic view of a feeder 47 for road construction work with a material hopper 49 and a conveyor 51 for paving material, which can be equipped with the operating arrangement 1 according to the disclosure.

What is claimed is:

1. An operating arrangement for a construction machine, comprising:
    an operating device comprising a touch-sensitive display for inputting operating instructions by an operator; and
    an operating mask with localization markers;
    wherein the operating device comprises at least one first alignment feature for aligning the operating mask on the operating device in a pre-defined operating position relative to the operating device, the operating mask is detachably attachable to the operating device in the operating position and at least partially covers the touch-sensitive display, and the localization markers of the operating mask lie over specified areas of the display and facilitate locating the specified areas of the display for inputting instructions when the operating mask is in the operating position, and wherein the at least one first alignment feature comprises a plurality of threaded holes and the operating mask has a corresponding plurality of through holes for screws that are screwable into the threaded holes, so that the pre-defined operating position of the operating mask is defined by the positioning of the threaded holes and the through holes.

2. The operating arrangement according to claim 1, wherein the pre-defined operating position is unambiguously defined by the at least one first alignment feature.

3. The operating arrangement according to claim 1, wherein the operating mask comprises at least one second alignment feature configured to interact with the at least one first alignment feature to align the operating mask at the operating device in the pre-defined operating position.

4. The operating arrangement according to claim 1, wherein either the at least one first alignment feature comprises an elevation of the operating device and the operating mask has a corresponding recess or the at least one first alignment feature comprises a recess of the operating device and the operating mask has a corresponding projection, so that the pre-defined operating position of the operating mask is defined by an engagement of the elevation or the projection in the respective recess.

5. The operating arrangement according to claim 1, wherein the at least one first alignment feature is configured to interact with an element of the operating mask to releasably hold the operating mask at the operating device.

6. The operating arrangement according to claim 1, wherein the at least one first alignment feature comprises a boundary, a shape of which at least sectionally corresponds to an outline of the operating mask.

7. The operating arrangement according to claim 6, wherein the operating mask can only be inserted into an area surrounded by the boundary in the pre-defined operating position.

8. The operating arrangement according to claim 1, wherein the at least one first alignment feature is provided on the operating device outside the touch-sensitive display.

9. The operating arrangement according to claim 1, wherein the localization markers have tactile structures.

10. The operating arrangement according to claim 9, wherein the tactile structures comprise raised or lowered structures.

11. The operating arrangement according to claim 9, wherein the tactile structures comprise rough areas that are rough compared to adjacent areas of the operating mask.

12. The operating arrangement according to claim 1, wherein the localization markers comprise operating openings, and the specified areas of the touch-sensitive display are accessible through the operating openings for inputting instructions by touch when the operating mask is in the operating position.

13. A construction machine comprising the operating arrangement according to claim 1.

14. The construction machine according to claim 13, wherein the specified areas of the touch-sensitive display are each assigned to a specific function of the construction machine.

15. A method for re-configuring an operating arrangement of a construction machine, wherein the operating arrangement includes an operating device having a touch-sensitive display for inputting operating instructions for the construction machine by an operator of the construction machine, and first and second operating masks that are each attachable to the operating device;
    wherein the operating device comprises at least one first alignment feature for aligning the first operating mask on the operating device in a pre-defined first operating position relative to the operating device, the first operating mask is detachably attached to the operating device in the first operating position and at least partially covers the touch-sensitive display, and localization markers of the first operating mask lie over first specified areas of the display and facilitate locating the first specified areas of the display for inputting one or more of the operating instructions for the construction machine when the first operating mask is in the first operating position, the method comprising:
    changing programming of the touch-sensitive display;
    removing the first operating mask from the operating device;
    aligning the second operating mask in a second pre-defined operating position relative to the operating device by use of at least one of the at least one first alignment feature of the operating device; and
    detachably attaching the second operating mask to the operating device in the second pre-defined operating position for the second operating mask;
    wherein the second operating mask covers the touch-sensitive display at least partially after the second operating mask has been attached to the operating device, and localization markers of the second operating mask lie over second specified areas of the touch-sensitive display and facilitate finding the second specified areas of the touch-sensitive display for entering one or more of the operating instructions for the construction machine, and wherein the localization markers of the second operating mask are arranged in such a way that at least one localization marker of the second operating mask is located above an area of the touch-sensitive display different than areas above which localization markers of the first operating mask were located.

16. The method according to claim 15, wherein detachably attaching the second operating mask comprises screwing onto the operating device, clipping onto the operating device and/or sliding onto the operating device.

17. The method according to claim 16, wherein the at least one first alignment feature comprises a threaded hole and the operating mask has a through hole for a screw, and wherein detachably attaching the second operating mask comprises screwing the second operating mask onto the operating device.

18. The method according to claim 15, wherein the operating instructions comprise an operating instruction for setting an operating parameter of the construction machine.

19. The method according to claim 15, wherein changing the programming of the touch-sensitive display comprises adding a further input area on the touch-sensitive display that is represented by one of the second specified areas of the touch-sensitive display, wherein the further input area is covered by the first operating mask when the first operating mask is in the first operating position, and the further input area is accessible when the second operating mask is in the second predefined operating position.

20. The method according to claim 15, wherein the localization markers of the first operating mask or the second operating mask have tactile structures that comprise rough areas that are rough compared to adjacent areas of the respective operating mask.

21. An operating arrangement for a construction machine, comprising:
    an operating device comprising a touch-sensitive display for inputting operating instructions by an operator; and
    an operating mask with localization markers including tactile structures that comprise rough areas, wherein the rough areas are rough compared to adjacent areas of the operating mask;
    wherein the operating device comprises at least one first alignment feature for aligning the operating mask on the operating device in a pre-defined operating position relative to the operating device, the operating mask is detachably attachable to the operating device in the operating position and at least partially covers the touch-sensitive display, and the localization markers of the operating mask lie over specified areas of the display and facilitate locating the specified areas of the display for inputting instructions when the operating mask is in the operating position.

* * * * *